United States Patent

Webster

[11] 3,730,567
[45] May 1, 1973

[54] COUPLING SLEEVE

[75] Inventor: Frank R. Webster, Tarzana, Calif.

[73] Assignee: Axial Corporation, Burbank, Calif.

[22] Filed: July 8, 1970

[21] Appl. No.: 53,196

[52] U.S. Cl. ............................. 285/382.4, 285/417
[51] Int. Cl. ............................................. F16l 13/14
[58] Field of Search .................... 285/382.4, 382 R, 285/382.5, 382.7, 417, 369; 287/109

[56] References Cited

UNITED STATES PATENTS

| 2,252,274 | 8/1941 | Rossheim et al. | 285/382.4 |
| 3,432,916 | 3/1969 | Fisher et al. | 285/382.4 X |
| 2,454,557 | 11/1948 | Jacobson | 285/382 X |
| 3,245,701 | 4/1966 | Leopold et al. | 285/369 X |
| 3,149,860 | 9/1964 | Hallesy | 285/417 X |

FOREIGN PATENTS OR APPLICATIONS

| 8,180 | 1906 | Great Britain | 285/382.4 |

Primary Examiner—David J. Williamowsky
Assistant Examiner—Wayne L. Shedd
Attorney—Christie, Parker & Hale

[57] ABSTRACT

A coupling sleeve for swaged attachment to tubing. The sleeve is a cylindrical body having a pair of annular grooves of a predetermined depth provided in the inner peripheral wall with the grooves being separated by an annular ring or land raised from the floor of the grooves. The width of the annular ring in the axial direction is such that tubing swaged into the grooves tends to assume a separate bend adjacent each land edge and to remain essentially flat in the area intermediate the two edges. The inner diameter of the cylindrical body in the area of the annular ring is arranged such that it is less than the inner diameter of the body in the area of the annular grooves and greater than the inner diameter of the cylindrical body in the area remote from the grooves thereby resulting in a two stage application of force to the tube walls during the swaged attachment operation. In certain embodiments a raised portion intermediate the sleeve ends provides oppositely facing abutment surfaces on the exterior of sleeve.

11 Claims, 5 Drawing Figures

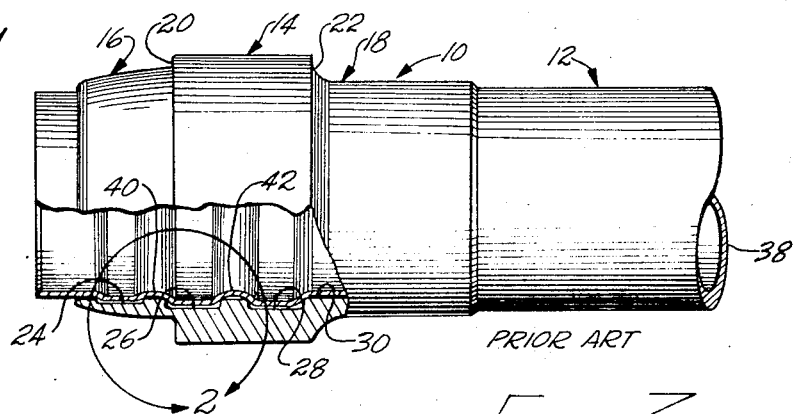
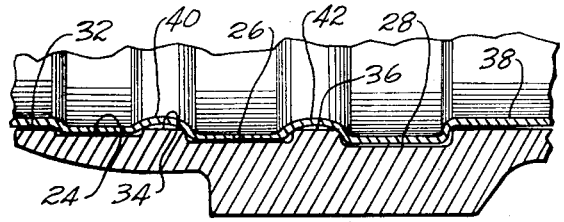
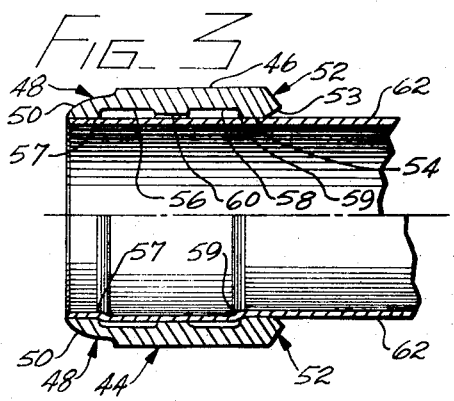
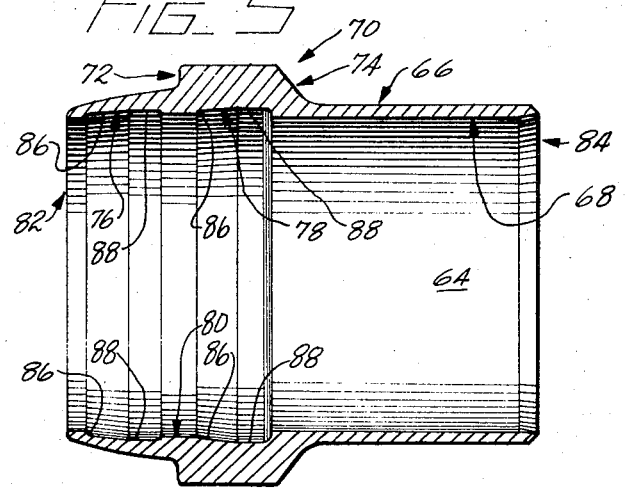
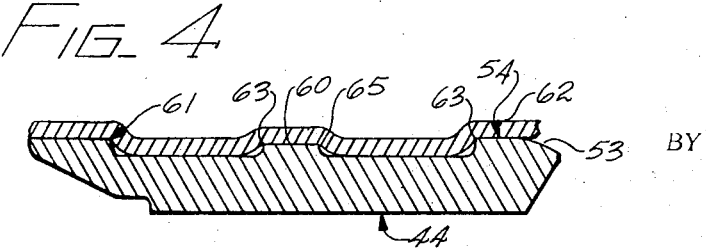
INVENTOR.
FRANK R. WEBSTER

COUPLING SLEEVE

DESCRIPTION OF THE PRIOR ART

The present invention relates to an improved coupling sleeve for rigid attachment to thin wall tubing and, in particular, to a sleeve having an interior configuration such that it can be swaged to such tubing in a leak-proof manner without affecting the mechanical properties of the tubing and regardless of the material from which the tubing is fabricated.

In many applications of hydraulic systems, particularly where weight is an important factor, e.g., in aircraft and aerospace vehicles, special equipment such as light weight, thin wall, high strength materials have been used in the tubes or pipes in the systems. Typical of the types of tubing material used heretofore are aluminum and stainless steel. Normally pressure requirements of such systems and the thinness of the tubing walls precludes the use of conventional screw threads and fittings for providing connection of the necessary joints, unions, and fixtures to the tubing and for connecting standard lengths of tubing.

As a substitute for conventional attachments and fittings sleeves of a predetermined interior and exterior configuration which are swaged onto the tubing to provide a rigid, fluidtight seal thereto have been utilized. Once swaged, the tube and sleeve combination can then be coupled to suitable threaded fittings by means of overlapping threaded nuts which draws the fitting and swaged tube into a fluidtight abutting relationship. One embodiment of such a structure is described in U.S. Pat. No. 3,484,123.

The interior configuration of the sleeves is particularly important in obtaining a satisfactory seal while at the same time providing a structure which is easily and quickly attached. The typical interior configuration has two or three spaced annular grooves located adjacent one end of the sleeve. The grooves are separated by intermediate lands or annular rings having the same diametrical dimension as the main portion of the cylindrical sleeve body. Typically the grooves have a stepped relationship with each successive groove being cut more deeply into the inner peripheral wall of the sleeve, i.e., the diametrical dimension as measured in the area of each of the grooves increases moving from groove to a more interiorly located groove.

As more stringent weight and strength demands have been imposed upon all structural elements in aircraft and aerospace vehicles, resort has been had to materials other than aluminum and stainless steel in order to obtain increased strength to weight ratios. In particular, titanium has come to be used as such a substitute material. In the course of attempting to obtain satisfactory swaged attachment of sleeves to titanium tubing it has been discovered that the sleeves that have heretofore been used are unsatisfactory for several reasons. In particular, because of its peculiar physical characteristics, it has been found particularly difficult to obtain satisfactory repeatable swaged attachments which provide acceptably fluidtight seals. This is due to the tendency of the titanium tubing to crack and fatigue in the area of the grooves of the swaged sleeve. As a more general observation it has been apparent that the sleeves of the prior art are primarily useful only with aluminum, stainless steel and other materials having similar physical properties because it is only such materials of relatively high elasticity which can withstand the strains imposed by being swaged into the grooves of the prior art sleeves without affecting the mechanical properties of the tubing and the quality of the tube obtained.

SUMMARY OF THE PRESENT INVENTION

The present invention provides a sleeve having universal application as a suitable member for swaged attachment to tubing of materials of such diverse physical characteristics as aluminum, stainless steel and titanium. The sleeve is characterized by a particular number and configuration of grooves which are provided in the inner peripheral wall of the sleeve and the specific dimensional relationship of the annular land or ring located intermediate the grooves relative to the longitudinal and diametrical dimensions of the grooves and the diametrical dimension of the inner peripheral wall of the sleeve.

In structural terms, the present invention provides a sleeve member for swaged connection to a tube comprising a hollow cylindrical body of a predetermined length having a first inner diameter and a pair of annular grooves located in the inner wall of the body, the grooves having a depth such that the second inner diameter taken at the location of the grooves is greater than the first inner diameter.

A land is located between the two grooves having a height dimension relative to the grooves such that a third inner diameter taken at the location of the land is greater than the first inner diameter and less than the second inner diameter.

The invention further provides a method for attaching sleeves to tubing comprising the steps of positioning the sleeves about the tubes at the point of attachment and expanding a section of the tubing wall radially outwardly over an extended recessed area located in the interior peripheral wall of the sleeve. The expansion of the tubing wall continues until a portion thereof is caused to contact a portion raised from the interior of the sleeve located intermediate the ends of the recessed area and thereafter the tubing wall is further expanded radially outwardly into the spaces of the recessed area located on opposite sides of the raised portion until such spaces are substantially filled.

A structure is thereby provided which can be quickly and easily attached to tubing and which when swaged provides a seal capable of providing a fluidtight connection regardless of the pressure in the hydraulic system and one which has a threshold of failure in excess of the pressure limits of the tubing to which the sleeve is attached. The design is suitable for attaching to all tubing materials, including titanium, because by virtue of the two stage application force and the dimensional limitations of the land and groove configuration in the interior of the sleeve, a substantially reduced amount of elongation of the tubing material is required while still obtaining a completely satisfactory swaged attachment. The interior configuration of the sleeve allows for a wide range of tubing tolerances not only in the dimensional sense but also in the physical sense in that dimensional limitations of the configuration can be selected so as to accommodate the low elongation and yield before failure characteristic of a material such as titanium. This objective is accomplished by the present invention producing maximum retention of the sleeve to the tubing to which it is swaged, while at the same time reducing the amount of "stretch" required by the material to get full deformation into the grooves and thereby eliminating the creation of stresses or fatigue points which in turn are a potential source of cracks or leaks.

DESCRIPTION OF THE DRAWINGS

The foregoing and other details of the invention will be better understood by reference to the drawings wherein FIG. 1 is an elevational view partially in section of a prior art sleeve in swaged attachment to a length of tubing;

FIG. 2 is an enlarged view of a portion of the section of FIG. 1 taken in the area circumscribed by circle 2;

FIG. 3 is a sectional view in elevation of a first embodiment of a sleeve according to the present invention during stages of the swaging operation;

FIG. 4 is an enlarged view of the sleeve embodiment shown in FIG. 3 after completion of the swaging operation; and FIG. 5 is a sectional view in the elevation of an alternate embodiment of the sleeve according to the present invention.

DESCRIPTION OF A SPECIFIC EMBODIMENT

A sleeve 10 according to the prior art is illustrated in FIGS. 1 and 2 in swaged attachment to a length of tubing 12 in position to serve as an element for coupling the tubing to a fitting and/or an adjacent length of tubing. The exterior peripheral surface of the sleeve 10 is divided into a central section 14 and a first and second end section 16, 18 extending in opposite direction from section 14. End sections 16, 18 are each of a diameter less than the diameter of the middle section and are integrally formed with the central section 14 to define at their points of juncture with the central section a first and second shoulder 20, 22 facing in opposite directions from the central section 14. Shoulders 20 and 22 provide abutment surfaces for the swaging equipment when the sleeve is being attached to the tubing and for other elements of a coupling assembly, e.g., an overlapping nut, when the tube is used with a union or other type of fitting.

As seen from the sectional portion of FIG. 1, and the enlarged section view in FIG. 2, sleeve 10 is provided with a first, second and third annular groove 24, 26 and 28, respectively, in the interior peripheral wall 30 of the sleeve. The first groove 24 is located in the interior wall of first end section 16 with the second and third grooves 26, 28 being located at successively more remote interior positions, generally in the region of the sleeve defined by central section 14. Located adjacent groove 24 and extending from the boundary thereof to the lip of sleeve 10 is a first annular ring or land 32 having an inner diameter less than the inner diameter of groove 24. Located between grooves 24 and 26 and between grooves 26 and 28 are second and third annular rings or lands 34, 36 which have the same inner diameter as ring 32. As the stepped appearance of the three grooves 24, 26 and 28 indicates, each more interiorly located groove is deeper relative to the preceding groove, i.e., the diameter of groove 28 is greater than the diameter of groove 26, which is in turn greater than the diameter of groove 24.

As is more clearly seen from FIG. 2, the wall 38 of tubing 12 when swaged into sleeve 10 is caused to extend or bulge outwardly into the three grooves 24, 26 and 28. In the area adjacent lands 34 and 36, first and second ridges 40, 42 are formed bridging the longitudinal surface area of the lands, the ridges having a substantially continuous surface of curvature. In geometrical terms, ridges 40, 42 have a bend or curvature of approximately 180°.

One embodiment of a sleeve 44 according to the present invention is illustrated in FIG. 3. As shown therein, sleeve 44 is provided with a continuous exterior peripheral wall 46 over a substantial portion of the overall length of the sleeve. At the tube end or forward end of sleeve 44 a reduced portion 48 is provided having a sloping annular surface 50. At the opposite or rear end sleeve 44 is provided an annular abutment surface 52 which in cross section slopes from exterior peripheral wall 46 to a point of junction with an intermediate surface 53. Surface 53 in turn extends to a point of juncture with the interior peripheral wall 54 of sleeve 44. Cut into interior peripheral wall 54 is a first annular groove 56 and a second annular groove 58. Separating the two grooves is an annular ring or land 60 having predetermined dimensions in the longitudinal and diametrical directions.

As is clearly shown from the top portion of FIG. 3 depicting the relationship of sleeve 44 to a length of tubing 62 in the unswaged condition, inner peripheral wall 54 has an inner diameter which is less than the inner diameter measurement of the two grooves 56, 58 as well as the inner diameter measurement of the annular ring 60. Furthermore, both grooves 60 are of uniform cross section throughout and are similar in all physical dimensions including longitudinal length.

The larger diametrical dimension of ring or land 60 relative to the diametrical measurement of the interior peripheral wall 54 of the sleeve is an important aspect of the structure of the present invention and a significant factor in rendering the sleeve suitable for swaged attachment to all known tubing materials. When the sleeve is attached by swaging, i.e., by exerting pressure radially outwardly against the walls of tubing 62 such a by means of an expanding elastomer as described in U.S. Pat. No. 3,200,628, a two stage application of force to the tubing walls is obtained.

In the first stage of force application (bottom portion, FIG. 3), that portion of tubing 62 located between the boundaries defined by edge 57 of groove 56 and edge 59 of groove 58 is caused to expand outwardly. As opposed to the conditions encountered in the swaging of a sleeve such as that shown in FIGS. 1 and 2, where the inner diameter of the lands separating the grooves is the same as the inner diameter of the interior peripheral wall, the different and greater diametrical dimension of the land 60 of the present invention relative to the interior peripheral wall of the sleeve means that during the first stage of force application the entire portion of the wall is moved outwardly a distance corresponding to the difference in diameter between sleeve and land, resulting in a substantial reduction in the amount of elongation imparted to the material of the tubing during this first stage of the swaging operation. Thus, materials such as titanium which have low elongation characteristics, can now be used as tubing material, whereas use of sleeves of the prior art with materials such as titanium would have produced an excessive elongation alternately causing cracks and breaks in the tubing walls as the swaging operation was being carried to completion.

The first stage of force application ends when the exterior wall of the tubing comes in contact and bears against the surface of annular ring 60. At this point the second stage begins with continued outward radial pressure causing the material of the tubing to expand into the recesses defined by grooves 56 and 58 until such time as these grooves are substantially filled and the exterior peripheral wall of the tubing is seated against and flush with the interior peripheral wall of the two grooves.

Referring to FIG. 4, an enlarged sectional view of the structure of FIG. 3, the result of swaging with a sleeve and according to the method of the present invention is illustrated. Another important aspect of the invention is that in the swaged condition the length of the tubing wall adjacent the interior wall 54 and land 60 is essentially flat except in the areas of the edges 61, 63, 65, 67 of grooves 56 and 58. Thus, when used with a sleeve according to the present invention, the tubing wall undergoes two approximately 90° bends in traversing the region of land 60 rather than one continuous 180° bend as is characteristic of the condition of the tubing wall when used with prior art coupling sleeves. The result is a reduction in the amount of elongation to which the tubing material is subjected. This essentially flat configuration of the tubing wall over a substantially portion of the longitudinal length of land 60 is due to the substantially increased dimension in this direction of the land relative to the same dimension in prior art sleeves. The two groove-one land configuration in the inner peripheral wall of the sleeve of the present invention also contributes toward the objective of reducing tube elongation. This is to be contrasted with the conventional three groove-two land configuration of the prior art. The depth of the two grooves is likewise selected so as not to impart more than a predetermined amount of elongation during swaging. The net result of the various aspects discussed is a sleeve suitable for swaged attachment to all types of tubing material without affecting the mechanical properties of the tubing while, at the same time providing a sleeve which can be rigidly attached to tubing and capable of functioning in all respects in the same manner as prior art sleeves.

The structure of FIG. 5 illustrates another embodiment of a sleeve according to the present invention. Shown therein is a sleeve 64 having an outer peripheral wall 66 and an inner peripheral wall 68. Located intermediate the ends of the sleeve and raised from the outer peripheral wall is a portion 70 defining a forwardly facing and rearwardly facing abutment surface 72 and 74, respectively.

A first annular groove 76 having a specific configuration is cut into the inner peripheral wall 68 adjacent the forward or tube end of the sleeve. A second annular groove 78 located interiorly of the first groove 76 is cut into the interior peripheral wall such that a circular land or ring 80 is defined between the two annular grooves. The diameter of the inner peripheral wall measured in the area of land 80 is larger than the diameter of the inner peripheral wall measured at the forward end 82 of the sleeve as well as in the area located interiorly of second annular groove 78 and extending toward the rear end 84 of the sleeve. As with the embodiments in FIGS. 3 and 4, the relationship of the diameter of the grooves relative to the basic inner diameter of the sleeve body and the diameter at the circular land or ring is an important aspect of the present invention.

Annular grooves 76 and 78 have a specific sectional configuration wherein approximately the leading two-thirds of each of the grooves measured in the longitudinal or axial direction toward end 84 has a sloping face 86. The remaining third measured in the same direction is provided with an essentially flat face 88. The sloping configuration of groove 76 in the area adjacent end 82 provides a sleeve of greater structural integrity due to the presence of additional sleeve material in this region. AS shown in FIG. 5 the length of the body end of sleeve 64 between surface 74 and end 84 is in excess of three times the width dimension of groove 76.

As with the sleeve illustrated in FIG. 3, the dimensions and configuration of the annular grooves and land are chosen such as to make the sleeve applicable for swaged attachment to tubing of any type of material. By providing a land having a diameter greater than the diameter of the inner peripheral wall, the application of force to the tubing walls by means of an expander type of swaging operation causes a two-stage application of force to the tubing, the first stage existing up until the time the tubing wall contacts the land 80. Where the prior art configuration imposed a requirement for the full elongation capability of the incremental area of the tubing opposite the land edges due to contact between the land and the tubing at the outset of swaging, the configuration of the present invention substantially eliminates elongation of the material during the first stage of force application, putting the tubing material into the groove areas with minimal stretching of these incremental areas. The second stage of force application continues until the wall material in the region of annular groove 76 and 78 is forced outwardly to substantially fill the cavities defined by the grooves. By further providing that the dimension of the land 80 in the axial or longitudinal direction is sufficiently large, the tubing utilized with this type of sleeve is also caused to experience two separate 90° bends in the areas adjacent the land edges rather than a single circular, approximately 180° bend as is characteristic of prior art sleeves. The net effect of the two-stage imposition of swaging force and creation of two separate bends eliminates almost entirely the criticality of the elongation of certain tubing materials, particularly titanium, thereby reducing or eliminating any problems of cracking or fatiguing of the tubing walls occurring during a swaging operation.

In the various embodiments of a sleeve according to the present invention, the depth of each annular groove is selected with relation to the elongation and yield characteristics of the material of the tubing to which it is to be swaged. Among the various materials from which light weight, strong tubing is commonly fabricated, the material having the lowest elongation and yield before failing is titanium and typically the depth of the grooves in sleeves according to the present invention will be selected such that when swaged a predetermined fraction of the elongation and yield limits of titanium, typically 60 percent, will not be exceeded. In the case of titanium the maximum elongation before yielding is approximately 8 percent. If desired, particularly where materials of higher elastic limits are used in the tubing, grooves of greater depth may be utilized. Regardless of the material to which the sleeve is to be attached, grooves having the relatively shallow depth corresponding to a sleeve to be used with titanium tubing provide a seal and an attachment of a character and integrity such that the tubing itself at a point intermediate the sleeves at either end will rupture or otherwise fail when subjected to bursting pressures before the swaged sleeve and tube portion.

What is claimed is:

1. A tube coupling assembly comprising:
   a tube member;
   a sleeve member of a predetermined length disposed about and affixed to said tube member, said sleeve member having an outer peripheral wall including a forward portion, a rear portion, and an intermediate portion extending radially outwardly of said forward and rear portions, said sleeve being positioned on said tube member such that said forward portion is adjacent the end of said tube member which is to be coupled;
   said sleeve member being rigidly swaged to a pressure tight seal to said tube member to constitute a rigid integral unit;
   said sleeve member having an inner peripheral wall having a maximum of two annular grooves, each groove defining a short right circular cylindrical portion and transverse front and rear wall portions positioned intermediate the ends of the sleeve, said annular grooves defining a raised area intermediate the grooves, the relative dimensions of the inner peripheral wall of the sleeve, the annular grooves and the raised area being such that the inner diameter of the sleeve member measured at the raised area is greater than the inner diameter of the inner peripheral wall and less than the inner diameter measured at the grooves, the tube member wall portions adjacent said pair of grooves extending into and substantially filling said grooves, the depth of the grooves and raised intermediate area relative to the inner peripheral wall of the sleeve being limited such that the elongation imparted to the tube is less than a predetermined fraction of the elongation limit of titanium.

2. An assembly according to claim 1 wherein the width dimension of the grooves taken in an axial direction is equal.

3. An assembly according to claim 2 wherein the grooves are of the same depth over the entire axial length of the grooves.

4. An assembly according to claim 2 wherein the groove surface portions are tapered outwardly in an axial direction extending away from the tube end of the sleeve.

5. An assembly according to claim 4 wherein the grooves tapers extend over a portion of the axial length thereof and the remaining portion of the grooves are of the same diameter over the axial length thereof.

6. A sleeve according to claim 3 wherein the exterior intermediate portion comprises a central portion extending radially outwardly beyond end portions integrally formed with and extending in opposite directions from the central portion, the point of conjunction between the respective end portions and the central portion providing abutment surfaces facing in opposite directions toward the ends of the sleeve.

7. A contoured coupling sleeve into which a tube is expanded comprising:
   a cylindrical body having a tube end, a body end, and an inner peripheral wall having a first diameter;
   a first annular groove located in the inner wall adjacent the tube end of the sleeve, said first groove having a predetermined width and a constant second diameter greater than said first diameter;
   a land located in the inner wall of the body adjacent the first groove on the side thereof opposite the tube end, the land having a third diameter greater than said first diameter and less than said second diameter;
   a second annular groove located in the inner wall adjacent the land on the side thereof opposite the tube end of the sleeve, the second groove having width and diametrical dimensions equal to the width and diametrical dimensions of the first groove, said first and second grooves and said land each having a diameter such that the expansion of the tube into engagement therewith is limited to an amount less than the physical limit of elongation of a titanium tube;
   a pair of abutment surfaces provided along the exterior peripheral wall of the sleeve, the body end of the tube having a length in excess of three times the width of one of said grooves.

8. A sleeve according to claim 7 wherein the depth dimension of the first and second annular grooves is partially tapered, the diameter being directed inwardly toward the tube end of the sleeve.

9. A sleeve according to claim 7 wherein the first and second annular grooves are of uniform cross section and have a diametrical dimension which is substantially constant over the entire axial extent of each of said grooves.

10. A sleeve according to claim 7 wherein the exterior peripheral wall of the sleeve is essentially smooth over a substantial portion thereof, the sleeve being provided with abutment surfaces at the opposite ends thereof.

11. A sleeve according to claim 7 wherein a portion of the exterior peripheral wall is raised from said exterior wall to provide a pair of oppositely facing abutment surfaces intermediate the ends of the sleeve.

* * * * *